United States Patent
Locatelli et al.

(10) Patent No.: US 7,518,408 B2
(45) Date of Patent: Apr. 14, 2009

(54) SYNCHRONIZING MODULES IN AN INTEGRATED CIRCUIT

(75) Inventors: Riccardo Locatelli, Grenoble (FR); Marcello Coppola, Moirand (FR); Daniele Mangano, Messina (IT); Luca Fanucci, Montecatini Terme (IT); Franscesco Vitullo, Matera (IT); Dario Zandri, Follonica (IT); Nicola L'Insalata, Mola Di Bari (IT)

(73) Assignee: STMicroelectronics SA, Montrouge (FR)

( * ) Notice: Subject to any disclaimer, the term of this patent is extended or adjusted under 35 U.S.C. 154(b) by 7 days.

(21) Appl. No.: 11/900,622

(22) Filed: Sep. 11, 2007

(65) Prior Publication Data

US 2008/0061835 A1 Mar. 13, 2008

(30) Foreign Application Priority Data

Sep. 13, 2006 (EP) .................................. 06291440

(51) Int. Cl.
*H03K 19/00* (2006.01)
(52) U.S. Cl. ............................ 326/93; 326/96; 713/600
(58) Field of Classification Search .................. 326/93, 326/95–96; 327/176; 375/354; 713/600
See application file for complete search history.

(56) References Cited

U.S. PATENT DOCUMENTS

| 5,919,265 A | * | 7/1999 | Nishtala et al. ............. 713/400 |
| 7,134,038 B2 | * | 11/2006 | Wong .......................... 713/600 |
| 2005/0008110 A1 | | 1/2005 | Lake et al. | |

FOREIGN PATENT DOCUMENTS

| EP | 0 590 212 A1 | 4/1994 |
| WO | WO 99/19806 A1 | 4/1999 |

* cited by examiner

*Primary Examiner*—Rexford Barnie
*Assistant Examiner*—Christopher Lo

(57) ABSTRACT

A synchronization system to synchronize modules (TX, RX) in an integrated circuit, such as a VLSI integrated circuit, in which the modules receive respective first and second clock signals (TX_CLK, RX_CLK) having a same frequency but being shifted by a constant and unknown phase difference. The system includes a first latch means for latching and delivering data in synchronism with the first clock signal and second latch means for latching data issued from the first latch means and delivering data in synchronism with the second clock signal, first and second latch means being controlled by first and second control signals (strobe_W, strobe_R) elaborated respectively from said first and second clock signals and one of said first and second control signal being shifted by an amount corresponding at least to the set-up time of at least one of said first and second latch means.

19 Claims, 4 Drawing Sheets

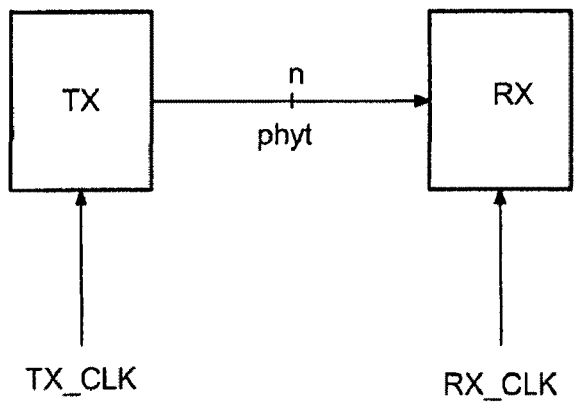
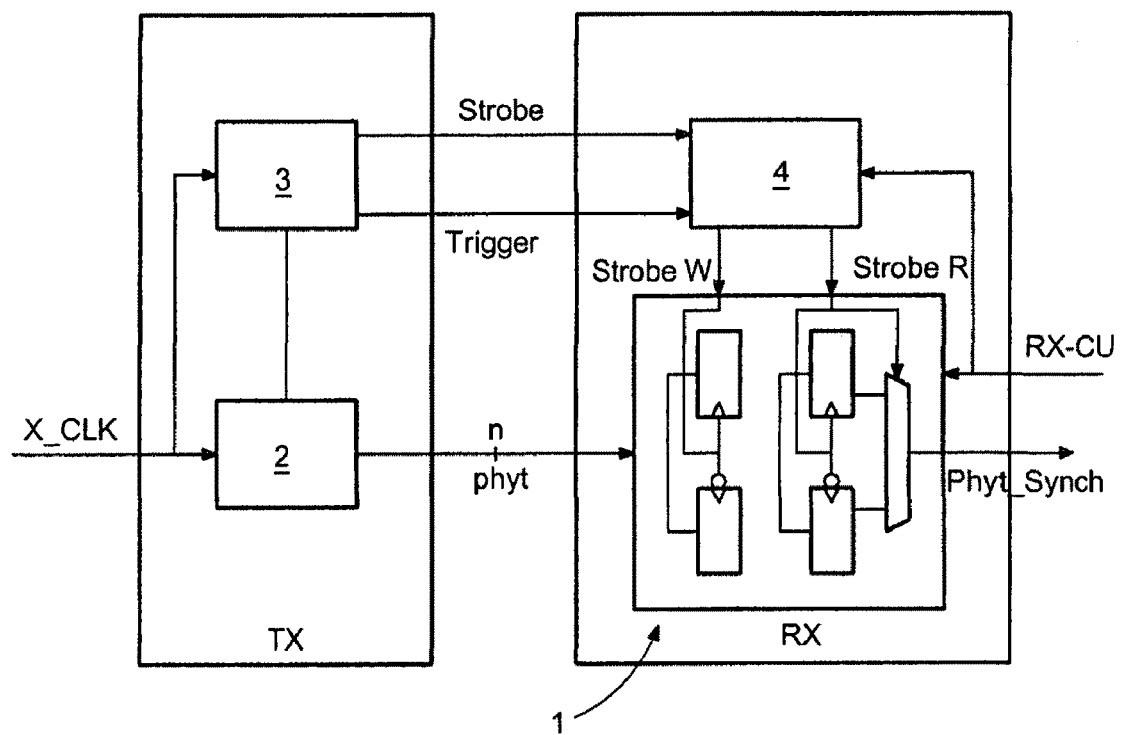

SYNCHRONIZING MODULES IN AN INTEGRATED CIRCUIT

CROSS-REFERENCE TO RELATED APPLICATIONS

The present application is related to European Patent Application No. 06 291 440.3, filed Sep. 13, 2006, entitled "SYNCHRONIZATION SYSTEM FOR SYNCHRONIZING MODULES IN AN INTEGRATED CIRCUIT". European Patent Application No. 06 291 440.3 is assigned to the assignee of the present application and is hereby incorporated by reference into the present disclosure as if fully set forth herein. The present application hereby claims priority under 35 U.S.C. §119(a) to European Patent Application No. 06 291 440.3.

TECHNICAL FIELD

The present disclosure relates generally to the synchronization of communicating blocks in an integrated circuit and more particularly to the synchronization of communicating blocks in, for example, Very Large Scale Integrated (VLSI) circuits.

BACKGROUND

Most conventional Very Large Scale Integrated (VLSI) systems are built according to the so-called "System-on-Chip" (SoC) concept.

SoC functionalities are the result of cooperation between several simpler modules which are generally selected by designers from a pre-existing library. The designers' role is to map the SoC functions onto that of the modules of the library. However, effective communication and interconnection systems are needed in order to meet suitable performances for the designed SoC system, and in particular, to provide an effective communication between the modules of the system.

As system complexity increases, on-chip communication becomes more and more critical. Conventional on-chip communication systems are complex infrastructures aimed at providing suitable performances. In addition, in the next few years, SoCs will include hundreds of communicating blocks running at many GHz. Such systems are known as multiprocessor System-on-Chips (MP-SoCs).

In conventional pre-deep submicron technology, the delay in VLSI systems is mainly due to logic cells. Due to technology improvements, gate delay tends to decrease while wires provided between the communicating modules have more and more impact on the overall delay involved during a communication. Accordingly, in conventional MP-SoCs, on-chip communication will limit the performance of such systems.

One of the main limitations relating to clock frequency is due to synchronization, which is supposed to guarantee that all communicating blocks meet the timing requirements and correctly exchanges data. Conventional synchronization techniques are getting more difficult due to wire delay problems and to increases in design complexity. In particular, timing requirements often lead to heavy constraints on interconnection wires and clock tree wires used to provide the communicating modules with clock signals. Accordingly, with the increasing wire delay problems and complexity, huge design efforts often require coping with synchronization issues, reducing productivity and increasing time-to-market.

Conventional design efforts fail to cope with clock distribution problems, wire delay balancing and, in general, to cope with synchronization.

Researchers have recently proposed the so-called Network-on-Chip (NoC) concept to overcome the limitations relating to the huge efforts necessary to adequately design on-chip communication systems. NoC aims at providing scalable and flexible communication architectures with suitable performance, even for future MP-SoCs. Moreover, NoCs provide the SoC architects with a tool for designing on-chip communication systems quickly, thus increasing productivity and reducing time-on-market.

NoC, however, is not a centralized architecture and is intended to be physically implemented as a distributed communication infrastructure. NoCs are nevertheless based on a packed-switched communication concept and are mainly composed of three NoC modules, namely: a router, a Network Interface (NI) and a link. However, the synchronization issues impose a heavy scalability limitation also for NoC architectures and solutions at the architectural level and must be provided to fully enable the NoC deployment.

Conventional clock distribution strategies have been already proposed to cope with synchronization issues. In particular, some techniques have been proposed to perform synchronization for synchronizing modules in an integrated circuit in which the module clocks have the same frequency but are potentially out of phase with an arbitrary constant phase difference.

Exploiting clock periodicity, periodic synchronizers predict whether incoming data switch in correspondence to arising clock edge or not. If periodic synchronizers detect a potential conflict between data switching and the clock at the receiving side, they delay either the rising edge or the data to avoid metastability.

In particular, in integrated circuits in which the communicating modules are clocked using clock signals having the same frequency but being out of phase with a constant arbitrary phase difference, which are usually called "mesochronous" systems, the periodic synchronizer can adjust the clock or data phase once for all the modules. Being done once, the synchronization phase can last an arbitrary amount of time, such that it is even possible to wait for metastability to decay.

Two main classes of periodic synchronizers have therefore been developed, namely delay line synchronizers and two register synchronizers. Delay line synchronizers use a variable delay placed on data lines. The delay on data is calculated to avoid switching in the metastability window of receiving registers. However, this solution is expensive, due to the presence of a variable delay line in each data path.

Two registers synchronizers insert a delay on the clock signal rather than on the data signal. Two registers are clocked by a direct clock and a delayed clock, respectively. The output of the register driven by the proper clock is chosen by means of a conflict detector which is able to detect the phase relationship between data and clock. It can be implemented in several ways, but generally comprises phase detectors, forbidden zone detectors and failure detectors such that it generally has a very complicated and extensive structure.

There is therefore a need for synchronization techniques to synchronize modules in an integrated circuit. There is also a need for techniques to synchronize communication blocks in VLSI circuits.

SUMMARY

Embodiments of the present disclosure generally provide a synchronization system for synchronizing modules in an integrated circuit of, for example, a mesochronous type.

In one embodiment, the present disclosure provides a system to synchronize modules in an integrated circuit. The system includes a first latch circuit to latch and deliver data in synchronism with the first clock signal. The system also includes a second latch circuit to latch data issued from the first latch circuit and to deliver data synchronized with a second clock signal. The first and second latch circuits are controlled by a first control signal and a second control signal elaborated respectively from the first and second clock signals. In addition, one of the first and second control signals is shifted by an amount corresponding at least to the set-up time of at least one of: the first latch circuit and the second latch circuit.

In another embodiment, the present disclosure provides a system to synchronize modules in the VLSI circuit for use in a very large scale integrated (VLSI) circuit. The system includes a first latch circuit to latch and deliver data synchronized with a first clock signal and controlled by a first control signal. The system also includes a second latch circuit controlled by a second control signal. The second latch circuit latches data issued from the first latch circuit and to deliver data synchronized with a second clock signal. In addition, one of the first and second control signals is shifted by an amount corresponding at least to the set-up time of at least one of: the first latch circuit and the second latch circuit. The system also includes, at a transmitting side, a register controlled by the first clock signal to deliver data to be transferred synchronized with the first clock signal. In addition, the system includes, at the receiving side, a circuit to elaborate the second control signal, the circuit comprising edge triggered flip-flops to receive the trigger signal, wherein the edge triggered flip-flops are controlled by the second clock signal.

In still another embodiment, the present disclosure provides a method of synchronize modules in an integrated circuit. The method includes latching data synchronized with a first clock signal in a first latch circuit and latching data issued by a first latch circuit with a second latch circuit synchronized with a second clock signal in a second latch circuit. The method also includes controlling the first and the second latch circuits respectively with a first control signal associated with a first clock signal and a second control signal associated with a second clock signal. In addition, one of the first and second control signals is shifted by an amount corresponding at least to the set-up time of at least one of: the first latch circuit and the second latch circuit.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 1 is a somewhat simplified diagram illustrating a transmitter module TX and a receiver module RX clocked by respective clock signal and an n-bit data phyt issued from the transmitter module RX according to one embodiment of the present disclosure;

FIG. 2 is a somewhat simplified diagram illustrating the overall structure of one embodiment of a synchronizing system according to the present disclosure;

DETAILED DESCRIPTION

Embodiments of the present disclosure generally provide a synchronization system for synchronizing modules in an integrated circuit of a mesochronous type, namely a circuit having communicating modules clocked with clock signals having the same frequency but being out of phase with an arbitrary constant phase difference.

FIGS. 1 and 2 illustrate schematically two communicating modules TX and RX, respectively, of a VLSI system and, in particular, a MP-SoC system.

As previously indicated, the system according to the present disclosure is used to implement a particular mechanism that is intended to guarantee correct communication between a transmitter module TX and a receiver module RX clocked by corresponding clock signals TX_CLK and RX_CLK, respectively, having the same frequency and having a constant but unknown phase relationship.

The aim of this system is to guarantee that the receiver module RX is able to read n-bit data phyt issued from the transmitter module TX. In particular, the synchronization system enables the RX module to read the data phyt after obtaining stability, so as to guarantee that no timing violation occurs.

Figure 3:
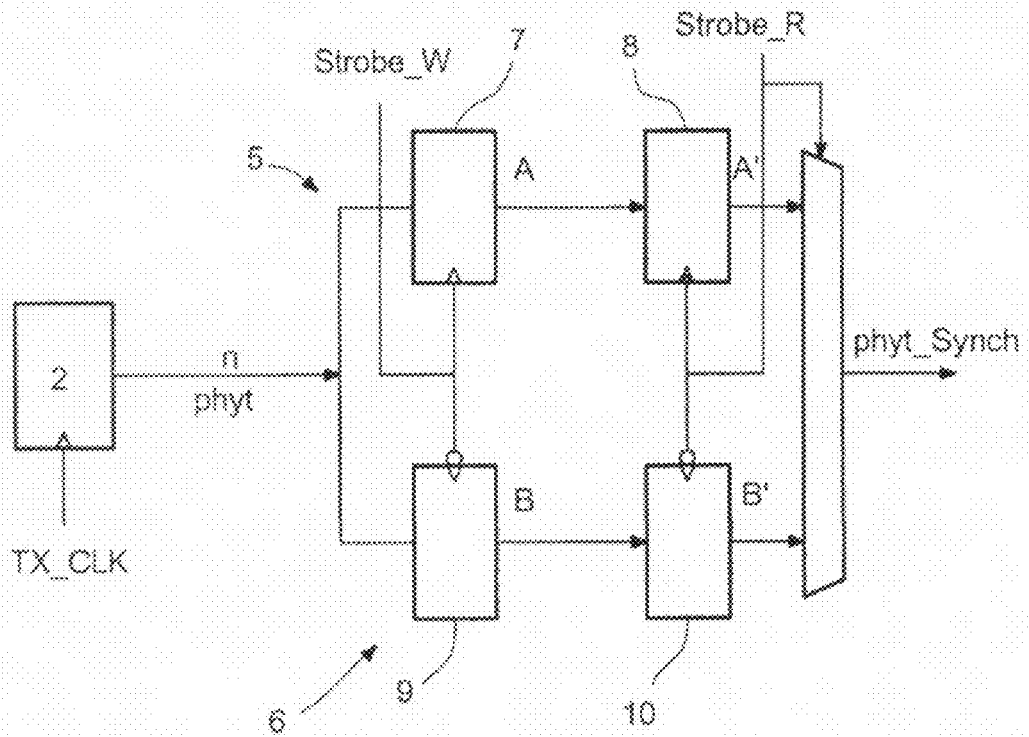
FIG. 3 is a somewhat simplified diagram illustrating the transmitting side and the receiving side of one embodiment of the synchronizing system according to the present disclosure, showing a two-stage buffer for latching data.

As also illustrated on FIG. 3, the synchronizing system is based on the use of a two-stage buffer structure 1 that is written by the transmitter module TX and read by the receiver module RX. On the transmission side, the system includes a register 2 which in turn includes D flip-flops that generate the data to be transmitted synchronously with the clock signal TX_CLK.

In addition, on the transmission side, the synchronization system includes a control block 3 that is responsible for generating a strobe signal "strobe" needed at the reception side for writing data in the two-stage buffer and a trigger signal "trigger" acting as a start-up signal.

On the reception side, the system includes a control block 4 used to elaborate, from the trigger and strobe signals, a first control signal strobe_W and a second control signal strobe_R used to control latching and delivery of data in the first stage and in the second stage of the two-stage buffer.

Accordingly, at the transmission side, the synchronization system task is to correctly generate the strobe signal needed at the reception side for writing data in the buffer 1. On the reception side, the synchronization system mainly provides the needed buffering capability, manages the mechanism to recover the synchronization at system start-up and to correctly read data from the buffer.

It should be noted that the link between the transmission side and the reception side works on a phyt basis. Phyt is, according to the present description, the amount of information that can be transferred in one channel cycle and is related to the width of the physical channel between two nodes. In general, more than one phyt is needed to transfer a data packet.

Referring to FIG. 3, the two-stage buffer 1 includes first latch means 5 and second latch means 6 and a multiplexer MUX used to deliver the synchronized data phyt_synch. Each latch means includes first and a second latches, respectively 7 and 8, on the one hand, and 9 and 10, on the other hand.

More particularly, the first latch means 5 includes a first latch 7 which is active on the rising edge of the first control signal strobe_W and a second latch 8 which is active on the raising edge of the second control signal strobe_R.

The second latch means are arranged similarly and includes a first latch 9 which is active on the falling edge of the first control signal strobe_W and a second latch 10 which is active on the falling edge of the second control signal strobe_R. For example, the latches 7, 8, 9 and 10 are constituted by flip-flop latches.

Figure 4:
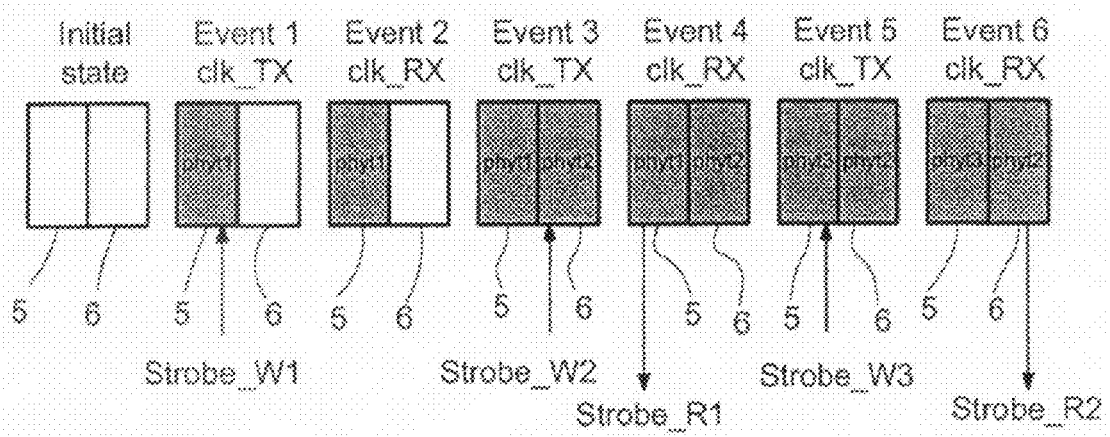
FIG. 4 is a somewhat simplified diagram illustrating latching data in the two-stage register according to one embodiment of the present disclosure.

Referring to FIG. 4, the operation of the two-stage buffer 1 is based on a specific policy for writing and reading data phyt into and from the buffer. In particular, FIG. 4, which illustrates the content of the first stage 5 and of the second stage 6 of the two-stage buffer 1 for incoming active edges of the first and second control signals, respectively strobe_W1, strobe_W2, strobe_R1, strobe_W3 and strobe_R2, starting from an initial state in which both of the buffer stages are empty, and after synchronization has been accomplished, incoming data phyt 1, phyt 2 ..., are alternately written in the two-stages 5 and 6. The strobe_W and strobe_R signals each have half the frequency of the master clock TX_CLK or RX_CLK. In addition, the first control signal strobe_W is shifted by an amount corresponding to at least the set-up time of the first latch means or of the second latch means or corresponding to at least the set-up time of the first and second latch means. This guarantees that buffer writing always happens on stages where data are stable.

In particular, the strobe_W signal is synchronous with TX_CLK whereas strobe_R is synchronous with RX_CLK. Accordingly, the second control signal strobe_R is responsible for reading data from the buffer stage whose input is stable and activates the multiplexer MUX in order to propagate the synchronized data phyt_synch to the output.

Figure 5:
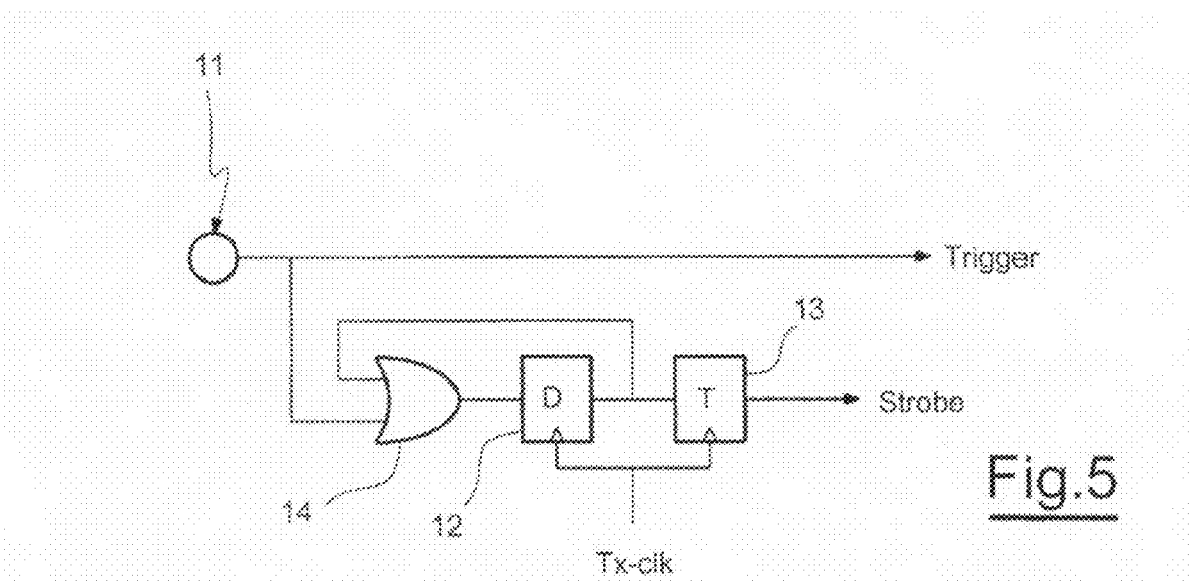
FIG. 5 illustrates the circuit intended to elaborate the trigger and strobe signals according to one embodiment of the present disclosure.

Referring now to FIG. 5, on the transmission side, the synchronization system includes a trigger generator 11 which delivers the trigger signal to provide start-up for the system. In addition, two flip-flops 12 and 13, respectively a D-flip-flop and a T-flip-flop, clocked by the TX_CLK clock signal receive the trigger signal and elaborate the strobe signal at a frequency equal to half the frequency of the TX_CLK clock signal.

In addition, a gate "OR" 14 realizes an operation "OR" between the trigger signal and the signal present at the node between the two latches 12 and 13, such that entry of the first latch 12 is kept at a high level, whatever the lever of the trigger signal is after start-up as occurred.

Figure 6:
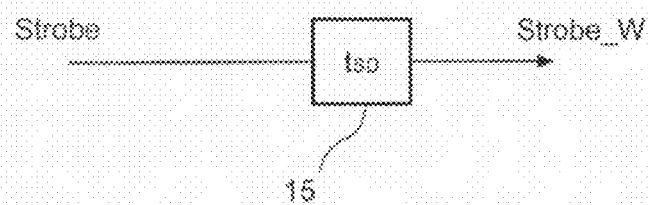
FIG. 6 illustrates the circuit intended to elaborate the first control signal according to one embodiment of the present disclosure.

Referring to FIG. 6, on the reception side, a delay gate 15 provides a delay $t_{sd}$ of at least the set-up time of the latch means to elaborate the first control signal strobe_W.

Figure 7:
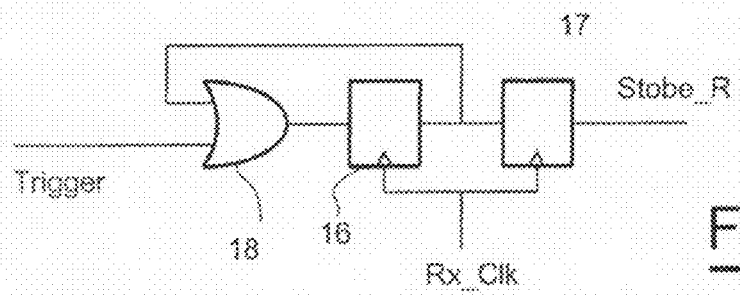
FIG. 7 illustrates the circuit intended to elaborate the second control signal according to one embodiment of the present disclosure.

Referring now to the second control signal shown in FIG. 7, this signal is also based on the use of two latches 16 and 17, respectively a D latch and a T latch, receiving the trigger signal and clocked by the RX_CLK clock signal to elaborate the second control signal strobe_R at a frequency equal to half the frequency of the clock signal at the reception side.

In addition, a "OR" gate 18 provides a logical operation "OR" between the trigger signal and the signal issued from the node between the two latches 16 and 17 in order to keep the entry of the first latch 16 at high level, whatever the lever of the trigger is after start-up has occurred.

As previously indicated, the control signals strobe_W and strobe_R manage respectively buffer writing and buffer reading operations.

At start-up initialization, the synchronization reception module is triggered by the trigger signal and correctly initializes buffer reading. The incoming trigger has to be synchronized with the RX_CLK clock signal. To recover synchronization, the synchronization system requires the transmitter module TX to set the trigger signal for a few cycles at start-up in order to trigger the reception synchronizer module at the receiver side. Once triggered, the synchronizer initializes the strobe_R signal. The number of flip flop D in the circuit of FIG. 7 can be arbitrarily chosen to have robust guarantee against metastability. The trigger pulse must last on time depending on the number of flip flops of circuits in FIGS. 5 and 7.

Synchronization is accomplished only at system start-up, according to the following procedure.

The transmitter sets the trigger signal for a number of clock cycles required by the synchronization system. The transmission synchronizer module is triggered and the strobe signal generation is started. The synchronization reception module samples incoming trigger signals and properly triggers the strobe_R signal generator.

Once synchronization has been completed, the phase relationship between strobe_W and strobe_R signals is continuously kept and timing of buffer operation is made. As previously indicated, the purpose of the synchronizer system is to put strobe_R and strobe_W signals in phase relationship such that safe buffer operations are guaranteed, assuring that the rising and falling edges of the strobe_R control signal always happens enough time after the rising and falling edges of the strobe_W to latch stable data.

The phase relationship between strobe_W and strobe_R, which are generated synchronously to TX_CLK and RX_CLK clock signals, respectively, depends on the amount of skew between the respective clock signals.

Figure 8:
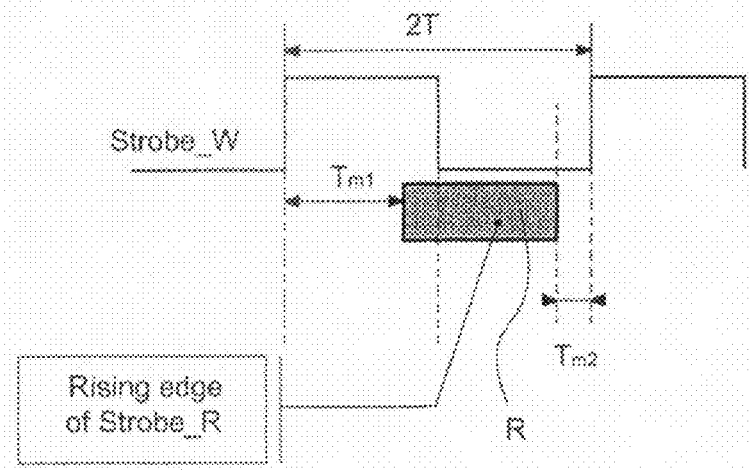
FIG. 8 illustrates an exemplary chronogram showing phase margins between the first and second control signals according to one embodiment of the present disclosure.

However, referring now to FIG. 8, it is possible to identify a temporal window in which a rising edge of the strobe_R control signal will always guarantee correct buffer operation. In FIG. 8, the rectangle R is the time window within which a rising edge of the strobe_R control signal may arrive.

Time delay Tm1 between the rising edge of the first control signal strobe_R and of the second control signal strobe_W and time delay Tm2 between the falling edge of the first and second control signals strobe_W and strobe_R can be tuned by varying the delay provided by the delay means (FIG. 6), with TM1+TM2=T, where T is the clock period.

Assuming that the trigger signal has the same delay than data phyt and that the strobe signal and the phyt data arrive at the same time at the reception side, the minimal value for the delay on the strobe line ($t_{sd}$) corresponds to the set-up time of the registers 7 and 9 (FIG. 3). By imposing the condition that guarantee that no timing violation occurs for the other registers, as concerns in particular set-up and hold times, it has been determined that a maximum operation frequency, namely the one limited by the technology involved for manufacturing the integrated circuit, is allowed when the delay $t_{sd}$ has its minimal value corresponding to the set-up time of the latches.

Figure 9:
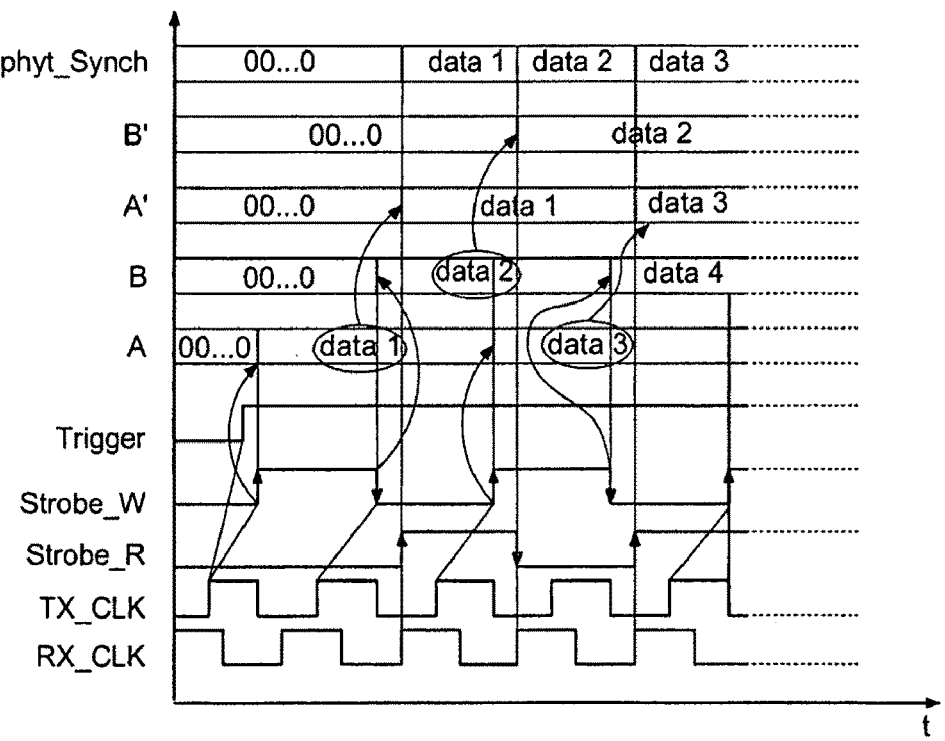
FIG. 9 illustrates exemplary chronograms showing timing examples associated with how the system according to one embodiment of the present disclosure works, and, in particular, how data are alternatively latched in the first and second latch means according to one embodiment of the present disclosure.
Figure 10:
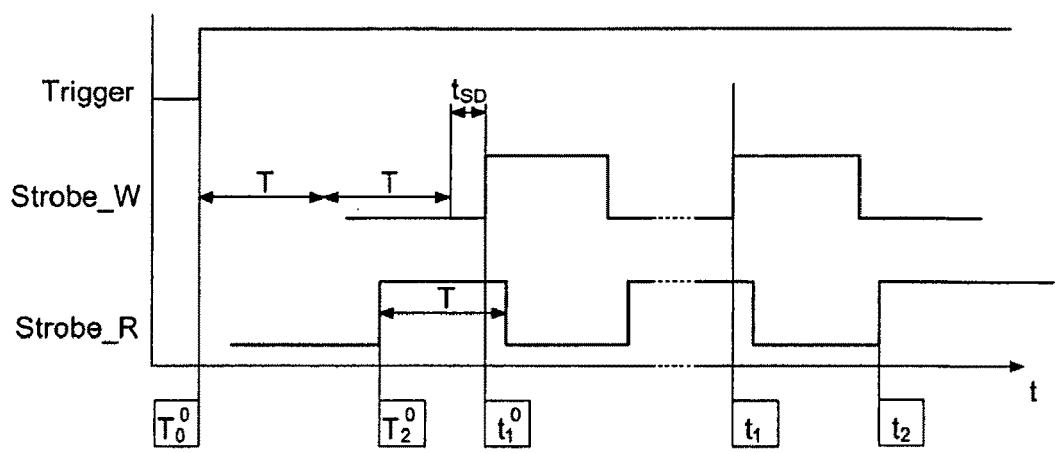
FIG. 10 illustrates exemplary chronograms showing the relative arrival times of control signals according to one embodiment of the present disclosure.

In other words, the maximum frequency of the clock signals RX_CLK and TX_CLK is linked to the set-up time of the register, and is independent from the circuitry, demonstrating that embodiments of the present disclosure work for all the possible frequency allowed by a given integration technology Referring to FIGS. 9 and 10, which illustrates chronograms of the first and second control signals and of the trigger signal, the following variables are defined:

$T_0^0$ is the arrival time of the trigger;

$t_1^0$ is the arrival time of the control signal strobe_W rising edge;

$t_2^0$ is the arrival time of the control signal strobe_R rising edge;

$t_1$ is the arrival time of the control signal strobe_W rising edge (steady-state); and $t_2$ is the arrival time of the control signal strobe_R (steady-state).

If $t_{fce}$ is defined as the temporal skew between the clock signals RX_CLK and TX_CLK, then the following results without loss of generality.

$$0 \leq t_{fce} < T \quad \text{(Eqn. 1)}$$

Signal strobe_W is generated synchronously with respect to the signal trigger, leading to the following relationship:

$$t_0^1 = T_0^0 + 2T + t_{SD} \quad \text{(Eqn. 2)}$$

The time $t_{sd}$ is the delay imposed on the strobe signal assuming that strobe_W and phyt arrive at the same time.

Signal strobe_R is generated synchronously with respect to the clock signal RX_CLK and is triggered by the trigger signal, leading to the following relationship:

$$T_0^0 + T \leq t_2^0 < T_0^0 + 2T \quad \text{(Eqn. 3)}$$

Suppose that $t_2$ is the rising edge of signal strobe_R after k periods (this signal has period 2T) with respect to the first positive edge:

$$t_2 = t_2^0 + 2kT \quad \text{(Eqn. 4)}$$

Suppose further that $t_1$ is the rising edge of signal strobe_R after k−1 periods (this signal has period 2T) with respect to the first positive edge:

$$t_1 = t_1^0 + 2kT - 2T \quad \text{(Eqn. 5)}$$

Suppose $T_0$ is defined as follows:

$$T_0 = T_0^0 + 2kT \quad \text{(Eqn. 6)}$$

From Equations 3, 4 and 6 the following relationship can be derived on $t_2$:

$$T_0 + T \leq t_2 < T_0 + 2T \quad \text{(Eqn. 7)}$$

From Equations 2, 5 and 6 the following relationship can be derived for $t_1$:

$$t_1 = T_0 + t_{SD} \quad \text{(Eqn. 8)}$$

It should be noted that the system, and in particular the transmitting side and the receiving side, namely the two stage buffer, can include a number of latches which can vary by design to avoid instability. In particular, the number of latches in the circuitry of FIG. 5 intended to generate the trigger and strobe signals and the circuitry of FIG. 7 intended to elaborate the strobe_R signal can have an odd or even number of latches.

In the case of odd-even choice, respectively, in the number of latches in the circuitry of FIGS. 5 and 7, the formulas above are still valid. In fact, the first rising edge of both strobe_W and strobe_R signals are shifted by an odd number of clock cycles and the overall effect is to introduce a shift between them by an odd number of clock cycles. Therefore, since strobe_R and strobe_W signals are periodic with period 2T, an overall shift of 2nT doesn't change the phase relationship and the steady state operation is the same in this even-odd case.

In case of an odd-odd (or even-even) choice, thanks to the proper initialization, the analysis above must be performed between the rising edge of the strobe_W and the falling edge of strobe_R. Therefore, $t_2$ is translated of T, and it is possible to show that the same relationship in formulas (7) and (8) are still valid.

Having $T_0 = t_1 - t_{SD}$, then the Equation 7 becomes:

$$t_1 + T - t_{SD} \leq t_2 < t_1 + 2T - t_{SD} \quad \text{(Eqn. 9)}$$

To guarantee proper latching of data phyt at the first registers 7 and 9, the following condition is assumed.

$$t_{SD} \geq T_{setup} \quad \text{(Eqn. 10)}$$

Necessary and sufficient conditions to guarantee correct operation are that $T_{setup}$ and $T_{hold}$ registers times are respected. Therefore, the following two conditions have to be imposed:

$$t_2 - (t_1 + \Delta) > T_{setup} \quad \text{(Eqn. 11)}$$

$$t_1 + 2T + \Delta - t_2 > T_{hold} \quad \text{(Eqn. 12)}$$

In Equations 11 and 12, Δ is a time delay including register propagation delay and delay of the wires interconnecting the registers.

From relationship found in Equation 9, two cases can be derived and, for each case, two conditions can be extrapolated:

First Condition:

$$t_2 = t_1 + T - t_{SD} \Rightarrow \begin{cases} T - t_{SD} - \Delta > T_{setup} \\ T + \Delta + t_{SD} > T_{hold} \end{cases} \quad \text{(Eqn. 13)}$$

Second Condition:

$$t_2 = t_1 + 2T - t_{SD} \Rightarrow \begin{cases} 2T - t_{SD} - \Delta > T_{setup} \\ \Delta + t_{SD} > T_{hold} \end{cases} \quad \text{(Eqn. 14)}$$

The fourth equation is practically always satisfied due to the fact that $T_{hold}$ time is usually less than the $T_{setup}$ time.

From the first three equations, the variable can be isolated to derive conditions about maximum clock frequency:

$$f_{clock} < \frac{1}{T_{setup} + t_{SD} + \Delta} \quad \text{(Eqn. 15)}$$

$$f_{clock} < \frac{1}{T_{hold} - t_{SD} - \Delta} \quad \text{(Eqn. 16)}$$

-continued $$f_{clock} < \frac{2}{T_{setup} + t_{SD} + \Delta} \quad \text{(Eqn. 17)}$$

$$f_{clock} < \frac{1}{T_{setup} + t_{SD} + \Delta} \quad \text{(Eqn. 18)}$$

Choosing the minimum value of $t_{SD}$ which guarantee correct operation of the synchronization system, in other words, $t_{SD} = T_{setup}$, the following final condition is obtained:

$$f_{clockMAX} = \frac{1}{2T_{setup} + \Delta} \quad \text{(Eqn. 19)}$$

Accordingly, as previously indicated, this maximum frequency is only dependant from $T_{setup}$ and $\Delta$.

It should be noted that the synchronization system according to the present disclosure is particularly intended to synchronize data between a transmitter and a receiver whose clock signals are generated by a single source and may have any amount of skew there between.

Accordingly, in one embodiment, the present disclosure could be advantageously applied in integrated circuits in which delays of wires have to be less than one clock cycle. For example, embodiments of the present disclosure could be orthogonal to the use of techniques to recover the quality of signals such as relay stations insertion or clock frequency reduction.

The present disclosure could also be applied with a great advantage in circuits in which data wires introduce the same delay that the one of the first and second control signals.

Accordingly, one embodiment of the present disclosure provides a synchronization system for synchronizing modules in an integrated circuit, in particular a VLSI integrated circuit. The modules receive first and second clock signals having the same frequency but being shifted by a constant and unknown phase difference.

In one embodiment, the synchronization system includes first latch means for latching and delivering data in synchronism with the first clock signal and second latch means for latching data issued from the first latch means and delivering data in synchronism with the second clock signal.

In addition, according to another feature of the present disclosure, first and second latch means are controlled by first and second control signals elaborated respectively from said first and second clock signals and one of said first and second control signal is shifted by an amount corresponding to at least the set up time of at least one of said first and second latch means.

According to yet another feature of the present disclosure, it could include a means for latching incoming data alternately in said first and second latch means. For example, said first and second latch means are activated, the one by a rising edge and the other by a falling edge of the corresponding control signal. Preferably, the first latch means includes first and second latches. The second latch means could also include first and second latches. Preferably, said first and second latches of the first and second latch means are edge triggered flip-flops.

According to a further feature of the present disclosure, the synchronization system could include, at a transmitting side, a register controlled by said first clock signal for delivering data to be transferred in synchronism with said first clock signal. For example, the register could comprise D flip-flops.

The synchronization system may further include means for elaborating the first control signal, said means including means for elaborating a strobe signal having a frequency equal to half the frequency of the first clock signal and delay means for delaying the strobe signal by at least the set-up time of the first and second latch means. For example, said means for elaborating the strobe signal could include a trigger generator for delivering a trigger signal and edge triggered flip-flops controlled by the first clock signal.

In addition, said means for elaborating the strobe signal could further include a logical circuit "OR" having an input receiving the trigger signal and another input receiving an output of one of said edge triggered flip-flops.

It could also further include, at the receiving side, means for elaborating the second control signal, said means including edge triggered flip-flops receiving the trigger signal and controlled by the second clock signal.

These means for elaborating the second control signal could further include, for example, a logical circuit "OR" having one input receiving the trigger signal and another input receiving an output of one of the flip-flops.

The flip-flops of the means for elaborating the second control signal could, in addition, include at least two flip-flops, the number of flip-flops being chosen in order to avoid instability.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system to synchronize modules in an integrated circuit, the system comprising:
    a first latch circuit to latch and deliver data in synchronism with a first clock signal;
    a second latch circuit to latch data issued from the first latch circuit and to deliver data synchronized with a second clock signal; and
    a circuit connected to produce a first control signal from the first clock signal, comprising a strobe signal circuit including a trigger generator to deliver a trigger signal, edge triggered flip-flops controlled by the first clock signal, and a logical circuit "OR" having one input receiving the trigger signal and another input receiving an output of one of the edge triggered flip-flops, wherein the first latch circuit is controlled by the first control signal and the second latch circuit is controlled by a second control signal elaborated from the second clock signal, and wherein one of the first and second control signals is shifted by an amount corresponding at least to a set-up time of at least one of: the first latch circuit and the second latch circuit.

2. The system according to claim 1 further comprising:
a third latching circuit to latch incoming data alternately in the first latch circuit and the second latch circuit.

3. The system according to claim 2, wherein the first and second latch circuits are activated by either a rising edge and the other by a falling edge of a corresponding control signal.

4. The system according to claim 1, wherein the first latch circuit comprises a first and a second latch, wherein the first and the second latch are edge triggered flip-flops.

5. The system according to claim 1, wherein the second latch circuit comprises a first and a second latch, wherein the first and the second latch are edge triggered flip-flops.

6. The system according to claim 1 further comprising:
at a transmitting side, a register controlled by the first clock signal to deliver data to be transferred synchronized with the first clock signal.

7. The system according to claim 6, wherein the register comprises D-flip-flops.

8. The system according to claim 1, wherein
the strobe signal circuit is capable of outputting a strobe signal having a frequency equal to half the frequency of the first clock signal.

9. The system according to claim 8, wherein the circuit connected to produce a first control signal from the first clock signal further comprises a delay circuit to delay the strobe signal by at least the set-up time of the first latch circuit and the second latch circuit.

10. The system according to claim 1 further comprising:
at the receiving side, a circuit to elaborate the second control signal, the circuit comprising edge triggered flip-flops to receive the trigger signal, wherein the edge triggered flip-flops are controlled by the second clock signal.

11. The system according to claim 10, wherein the circuit elaborating the second control signal further comprises a logical circuit "OR" having one input receiving the trigger signal and another input receiving an output of one of the flip-flops.

12. The system according to claim 10, wherein the flip-flops of the circuit to elaborate the second control signal comprise at least two flip-flops, wherein the flip-flops avoid instability.

13. The system according to claim 1, wherein the integrated circuit is a very large scale integrated (VLSI) circuit.

14. For use in a very large scale integrated (VLSI) circuit, a system to synchronize modules in the VLSI circuit, the system comprising:
a first latch circuit to latch and deliver data synchronized with a first clock signal and controlled by a first control signal;
a second latch circuit controlled by a second control signal, wherein the second latch circuit latches data issued from the first latch circuit and to deliver data synchronized with a second clock signal, wherein one of the first and second control signals is shifted by an amount corresponding at least to a set-up time of at least one of: the first latch circuit and the second latch circuit;

at a transmitting side, a register controlled by the first clock signal to deliver data to be transferred synchronized with the first clock signal;

at a receiving side, a circuit to elaborate the second control signal, the circuit comprising edge triggered flip-flops to receive a trigger signal, wherein the edge triggered flip-flops are controlled by the second clock signal; and a circuit connected to produce the first control signal from the first clock signal, comprising a strobe signal circuit including a trigger generator to deliver a second trigger signal, second edge triggered flip-flops controlled by the first clock signal, and a logical circuit "OR" having one input receiving the second trigger signal and another input receiving an output of one of the second edge triggered flip-flops.

15. The system according to claim 14, wherein the
a strobe signal circuit is capable of outputting a strobe signal having a frequency equal to half the frequency of the first clock signal, and the circuit connected to produce the first control signal from the first clock signal also includes a delay circuit to delay the strobe signal by at least the set-up time of the first and second latch means.

16. A method of synchronizing modules in an integrated circuit, the method comprising:
latching data synchronized with a first clock signal in a first latch circuit;
latching data issued by the first latch circuit with a second latch circuit synchronized with a second clock signal in the second latch circuit; and
producing a first control signal from the first clock signal using a strobe signal circuit including a trigger generator connected to to deliver a trigger signal, edge triggered flip-flops controlled by the first clock signal, and a logical circuit "OR" having one input receiving the trigger signal and another input receiving an output of one of the edge triggered flip-flops;
controlling the first and the second latch circuits respectively with first control signal and a second control signal associated with second clock signal,
wherein one of the first and second control signals is shifted by an amount corresponding at least to a set-up time of at least one of: the first latch circuit and the second latch circuit.

17. The method according to claim 16, further comprising:
controlling, at a transmitting side, a register with the first clock signal to deliver data to be transferred synchronized with the first clock signal.

18. The method according to claim 16 further comprising:
outputting a strobe signal having a frequency equal to half the frequency of the first clock signal; and
delaying the strobe signal by at least the set-up time of the first and second latch circuits.

19. The method according to claim 16 further comprising:
receiving, at a receiving side, a trigger signal in an edge triggered flip-flop, wherein the edge triggered flip-flops are controlled by the second clock signal.

* * * * *